United States Patent
Rogers

(10) Patent No.: US 9,021,890 B2
(45) Date of Patent: May 5, 2015

(54) MAGNETIC FLOWMETER WITH MULTIPLE COILS

(71) Applicant: Rosemount Inc., Chanhassen, MN (US)

(72) Inventor: Steven Bruce Rogers, Minnetonka, MN (US)

(73) Assignee: Rosemount Inc., Chanhassn, MN (US)

( * ) Notice: Subject to any disclaimer, the term of this patent is extended or adjusted under 35 U.S.C. 154(b) by 159 days.

(21) Appl. No.: 13/627,404

(22) Filed: Sep. 26, 2012

(65) Prior Publication Data

US 2014/0083199 A1  Mar. 27, 2014

(51) Int. Cl.
G01F 1/58  (2006.01)

(52) U.S. Cl.
CPC ............... *G01F 1/584* (2013.01); *G01F 1/588* (2013.01)

(58) Field of Classification Search
None
See application file for complete search history.

(56) References Cited

U.S. PATENT DOCUMENTS

| | | | | |
|---|---|---|---|---|
| 3,528,289 A | * | 9/1970 | Schwartzman | 73/861.63 |
| 3,712,133 A | | 1/1973 | Westersten | |
| 4,098,118 A | | 7/1978 | Schmoock | 73/861.12 |
| 4,125,019 A | | 11/1978 | Chushing | 73/861.12 |
| 4,181,018 A | | 1/1980 | Schmoock | 73/861.12 |
| 4,214,477 A | | 7/1980 | Schmoock | |
| 4,253,340 A | | 3/1981 | Schmoock | 73/861.12 |
| 4,358,963 A | | 11/1982 | Schmoock | 73/861.12 |
| 4,388,834 A | | 6/1983 | Schmoock | 73/861.12 |
| 4,420,982 A | | 12/1983 | Schmoock | 73/861.12 |
| 4,459,857 A | * | 7/1984 | Murray et al. | 73/861.12 |
| 4,497,212 A | | 2/1985 | Schmoock | 73/861.12 |
| 4,565,619 A | | 1/1986 | Gardner et al. | 204/400 |
| 4,567,775 A | | 2/1986 | Schmoock | 73/861.12 |
| 4,716,649 A | | 1/1988 | Bittner et al. | 29/602.1 |
| 4,726,236 A | * | 2/1988 | Wada | 73/861.16 |
| 4,736,635 A | * | 4/1988 | Murase | 73/861.15 |
| 4,774,844 A | | 10/1988 | Davis | 73/861.12 |
| 5,121,640 A | * | 6/1992 | van der Pol | 73/861.12 |
| 5,263,374 A | | 11/1993 | Marsh | 73/861.15 |
| 5,280,727 A | | 1/1994 | Hafner et al. | 73/861.12 |
| 5,316,035 A | | 5/1994 | Collins et al. | 137/312 |

(Continued)

FOREIGN PATENT DOCUMENTS

DE  10 2009 002053  10/2010
EP  0 418 033 A1  3/1991

(Continued)

OTHER PUBLICATIONS

Notification of Transmittal of the International Search Report and the Written Opinion of the International Searching Authority, or the Declaration dated Feb. 5, 2014 for International Application No. PCT/US2013/058472, filed Sep. 6, 2013. 10 pgs.

(Continued)

*Primary Examiner* — Harshad R Patel
(74) *Attorney, Agent, or Firm* — Westman, Champlin & Koehler, P.A.

(57) ABSTRACT

A magnetic flowmeter for measuring a flow of a process fluid includes a flowtube arranged to receive the flow of the process fluid. First, second and third coils are arranged adjacent the flowtube. First and second electrodes are arranged to sense an electrical potential of the process fluid related to an applied magnetic field and a flow rate of the process fluid. The sensed electrical potential is used to calculate the flow rate of the process fluid through the flow tube.

24 Claims, 7 Drawing Sheets

(56) References Cited

U.S. PATENT DOCUMENTS

| | | | |
|---|---|---|---|
| 5,449,017 A | 9/1995 | Collins et al. | 137/312 |
| 5,551,306 A * | 9/1996 | Scarpa | 73/861.16 |
| 5,670,724 A | 9/1997 | Batey | 73/861.12 |
| 5,866,823 A * | 2/1999 | Scarpa | 73/861.16 |
| 5,880,376 A | 3/1999 | Sai et al. | |
| 6,237,424 B1 | 5/2001 | Salmasi et al. | |
| 6,539,981 B1 | 4/2003 | Kleven et al. | 138/143 |
| 6,865,956 B2 * | 3/2005 | Yamamoto | 73/861.12 |
| 7,155,983 B2 | 1/2007 | Wehrs et al. | 73/861.12 |
| 7,293,468 B2 | 11/2007 | Ishikawa | |
| 7,343,817 B2 | 3/2008 | Wehrs et al. | 73/861.12 |
| 7,426,874 B2 * | 9/2008 | Yamamoto | 73/861.12 |
| 7,434,478 B2 * | 10/2008 | Yamamoto | 73/861.12 |
| 7,546,212 B2 | 6/2009 | Schrag et al. | 702/45 |
| 7,861,603 B2 | 1/2011 | Takayanagi | 73/861.355 |
| 7,866,337 B2 | 1/2011 | Chinnock et al. | 137/487.5 |
| 7,921,734 B2 | 4/2011 | Foss et al. | |
| 7,992,451 B2 | 8/2011 | Ehrenberg et al. | |
| 2003/0097882 A1 | 5/2003 | Schlosser et al. | 73/861.355 |
| 2004/0060366 A1 | 4/2004 | Yamamoto | 73/861.12 |
| 2006/0095217 A1 | 5/2006 | Coursolle et al. | 702/49 |
| 2006/0213285 A1 | 9/2006 | Thai et al. | 73/861.12 |
| 2007/0225922 A1 | 9/2007 | Foss et al. | 702/45 |
| 2008/0078252 A1 | 4/2008 | Graber et al. | 73/861.16 |
| 2008/0258736 A1 | 10/2008 | Schulz et al. | 324/537 |
| 2009/0188327 A1 | 7/2009 | Shanahan | 73/861.08 |
| 2010/0024568 A1 | 2/2010 | Diederichs | 73/861.12 |
| 2010/0107776 A1 | 5/2010 | Shanahan | 73/861.11 |
| 2010/0132479 A1 | 6/2010 | van Willigen | |
| 2010/0224008 A1 | 9/2010 | Foss et al. | 73/861.12 |
| 2010/0275701 A1 | 11/2010 | Foss et al. | 73/861.12 |

FOREIGN PATENT DOCUMENTS

| | | |
|---|---|---|
| GB | 990 484 A | 4/1965 |
| GB | 2 081 449 | 2/1982 |

OTHER PUBLICATIONS

First Office Action for Chinese patent application No. 201220694833.9, dated Apr. 8, 2013, 5 pages.

Notification of Transmittal of the International Search Report and the Written Opinion of the International Searching Authority, for PCT/US2013/05911, dated Dec. 5, 2013.

Office Action from U.S. Appl. No. 13/627,446, dated Aug. 13, 2014.

* cited by examiner

MAGNETIC FLOWMETER WITH MULTIPLE COILS

CROSS-REFERENCE TO CO-PENDING APPLICATION

In one specific configuration, four coils are employed such as those illustrated in co-pending application Ser. No. 13/627,446, titled INTEGRALLY MOLDED MAGNETIC FLOWMETER, by, Steven B. Rogers and Joseph A. Smith, filed on Sep. 26, 2012, and commonly assigned with the instant application.

BACKGROUND

The present invention relates to flowmeters of the type used to sense and measure flow of a process fluid in industrial process plants. More specifically, the present invention relates to measurement of flow using a magnetic flow meter.

Magnetic flowmeters are generally used to measure flow of a conductive process fluid through an electrically-insulated flow tube. In accordance with Faraday's law of electromagnetic induction, when the conductive process fluid moves in a perpendicular direction through a magnetic field, a voltage is induced in the fluid that is proportional to the velocity of the process fluid. The magnetic field can be created by a coil made out of a wire that has been bent into multiple, closely-spaced loops. A pair of electrodes is then used to measure the voltage induced by the movement of the process fluid.

The magnetic field can be generated by moving electrical charges. The magnetic field is often described using a mathematical description of the magnetic influence of electric currents and magnetic materials. The magnetic field at any given point is specified by a vector which has a direction and a magnitude (strength). The direction of the vector is determined by the direction in which the current is flowing through the coil. The strength and density of the magnetic field depends on the amount of the current and the area and shape of the coil. In particular, the total strength of the magnetic field increases with the length of the wire. For example, when a wire carrying a current is formed into a loop, the magnetic field concentrates inside the loop. When the wire is bent into multiple loops to form the coil, the magnetic field becomes even more concentrated.

SUMMARY

A magnetic flowmeter for measuring a flow of a process fluid includes a flowtube arranged to receive the flow of the process fluid. First, second and third coils are arranged adjacent the flowtube and configured to induce a magnetic field in the process fluid. First and second electrodes are arranged to sense an electrical potential of the process fluid related to the applied magnetic field and flow rate of the process fluid.

DETAILED DESCRIPTION OF ILLUSTRATIVE EMBODIMENTS

The present invention is directed to a magnetic flowmeter that measures flow of a process fluid through a flowtube. In one embodiment, the magnetic flowmeter of the present invention provides improved accuracy and increased sensitivity due to increased concentration or density of the magnetic field. In another embodiment, the present invention provides increased signal-to-noise ratio, which, in turn, improves the accuracy of the flowmeter. In yet another embodiment, the flowmeter provides for increased field density in desired regions of the flowtube. This results in increased sensitivity of the flowmeter. In yet a further embodiment, the invention includes a magnetic flowmeter having more than three coils and/or more than two electrodes. In still a further embodiment, the invention can be used to detect, measure, and compensate for asymmetries in a velocity profile of the flow of process fluid.

The magnetic flowmeter of the present invention includes a flowtube arranged to receive a flow of process fluid. Further, the flowmeter includes a plurality of coils arranged adjacent the flowtube. In a preferred embodiment, four coils are used. A controller is configured to apply a magnetic field to the process fluid using the plurality of coils. First and second electrodes are arranged to sense an electrical potential of the process fluid which is related to the applied magnetic field and the flow rate of the process fluid. A sensor is configured to receive a voltage from the first and second electrodes. The controller is configured to calculate the flow of the process fluid based upon the voltage sensed between the first and second electrodes.

Figure 1:
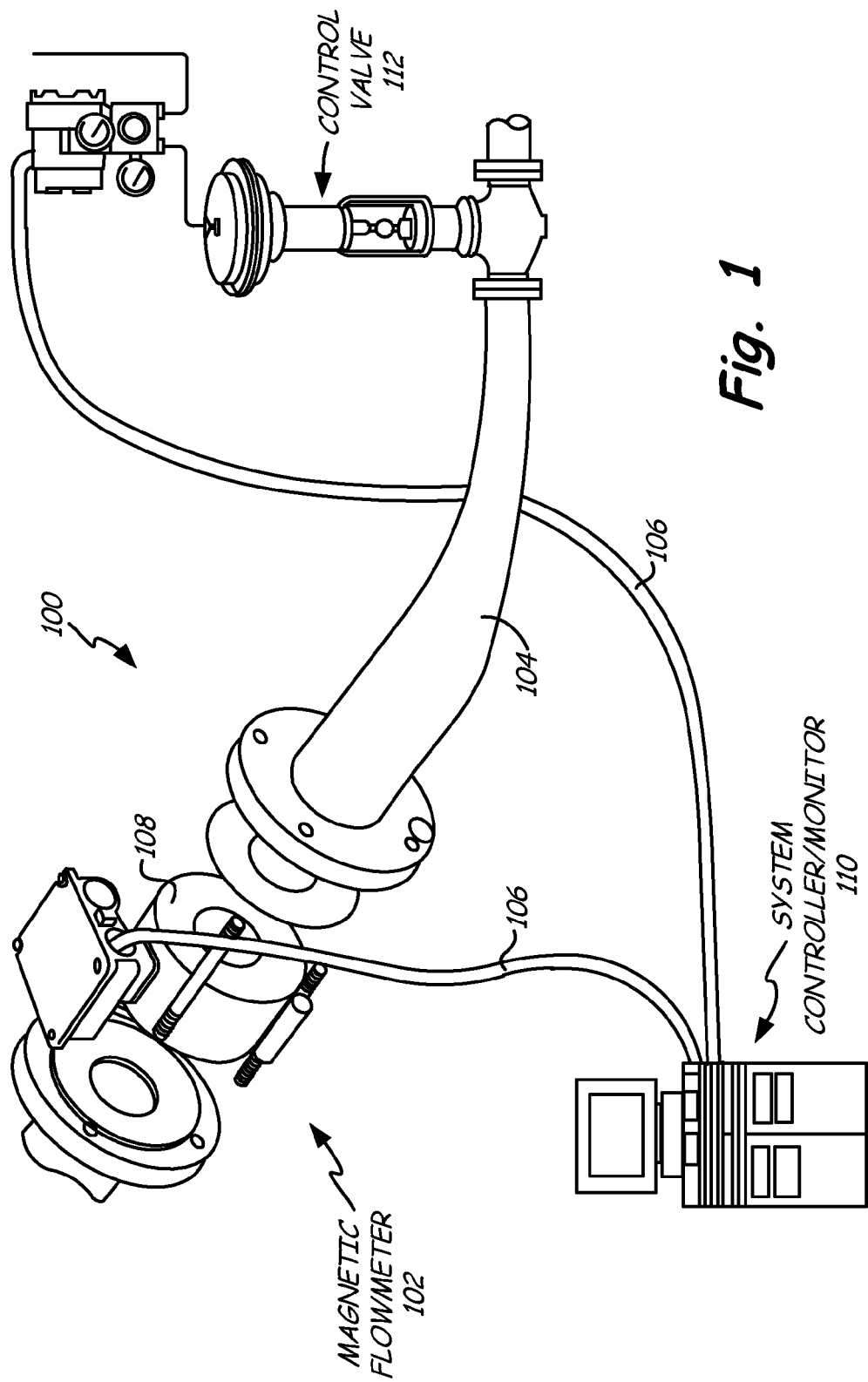
FIG. 1 is a diagram showing a process control system including a magnetic flowmeter.

In FIG. 1, a typical environment for magnetic flowmeter 102 is illustrated at 100. More specifically, FIG. 1 shows the magnetic flowmeter 102 coupled to process piping 104 which also couples to control valve 112. In a magnetic flowmeter, the monitored process variable relates to velocity of the process fluid through flowtube 108. Magnetic flowmeter 102 can be configured to provide an output for transmission over long distances to a controller or indicator, via communication bus 106. In typical processing plants, communication bus 106 can be a 4-20 mA process control current loop, a fieldbus connection, a pulse output/frequency output, a HART® protocol communication, a wireless communication connection, such as Wireless HART® communication protocol in accordance with the IEC 62591 Standard, Ethernet or fiberoptic connection, or other communication channel to a controller such as system controller/monitor 110 or other device. System controller 110 can be programmed as a process monitor, to display flow information for a human operator or as a process controller to control the process using control valve 112 over communication bus 106.

Figure 2:
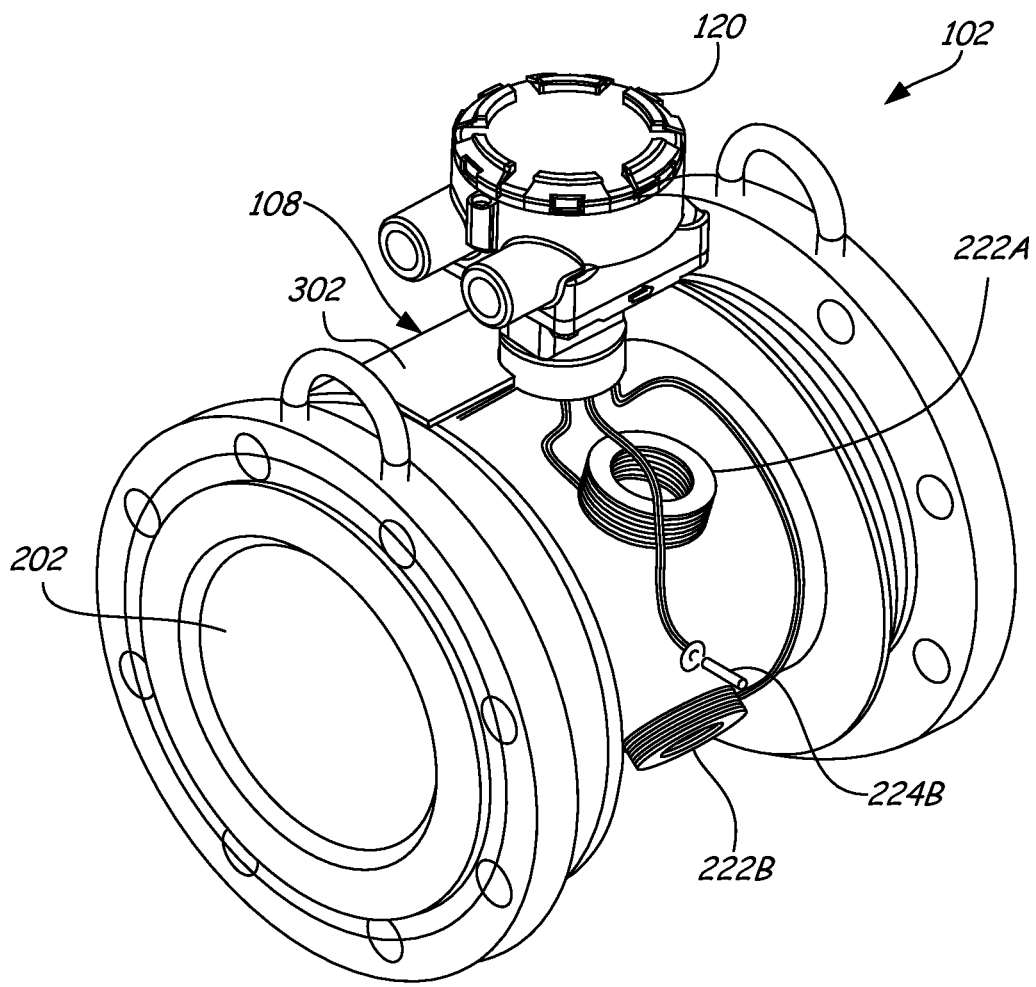
FIG. 2 is a partially cut away perspective view of the magnetic flowmeter of FIG. 1.

In FIG. 2, a perspective cut-away view of magnetic flowmeter 102 is shown. Flowmeter 102 includes electronics housing 120 connected to flowtube 108. Note that in FIG. 2, the flowmeter 102 is illustrated as a "flanged" flowmeter whereas in FIG. 1, flowmeter 102 is illustrated as a "wafer" style flowmeter. As illustrated in these figures, a flanged flowmeter includes flanges of its own for coupling to process piping. The present invention is applicable to either type of configuration. According to one embodiment, flowtube 108 can be formed of low magnetic permeability material with an electrically-insulating liner 202, a flowtube housing 302, and a first, second, third and fourth electromagnetic coil 222A, 222B, 222C, 222D arranged adjacent the flowtube 108. In one example, a molded flowtube is used such as that shown in co-pending Application No. 13/627,446, titled INTEGRALLY MOLDED MAGNETIC FLOWMETER, by, Steven B. Rogers and Joseph A. Smith, filed on September 26, 2012, and commonly assigned with the instant application. Note that in FIG. 2 only coils 222A and 222B are shown. The coils 222A-D are used to induce a magnetic field in the process fluid flowing through the flowtube 108. A first and second electrode 224A, 224B in the flow tube 108 provide an electromotive force (EMF) sensor which senses the EMF (voltage) generated in the fluid due to the velocity of the flow and the applied magnetic field 210. (Only electrode 224B is visible in FIG. 2). Process fluid flows through the magnetic field in the flowtube 108, and this flow induces the EMF in the fluid. Insulating liner 202 prevents leakage of the EMF from the fluid to the metal flowtube. The electrodes 224A,B sense the induced voltage or the EMF. A controller (not shown in FIG. 2) is configured to calculate the flow of the process fluid based upon the voltage sensed between the first and second electrodes 224A, 224B, in accordance with Faraday's law, which states that the EMF or voltage is proportional to the flow rate of the fluid 200 in the flowtube 108 and the applied magnetic field.

Figure 3:
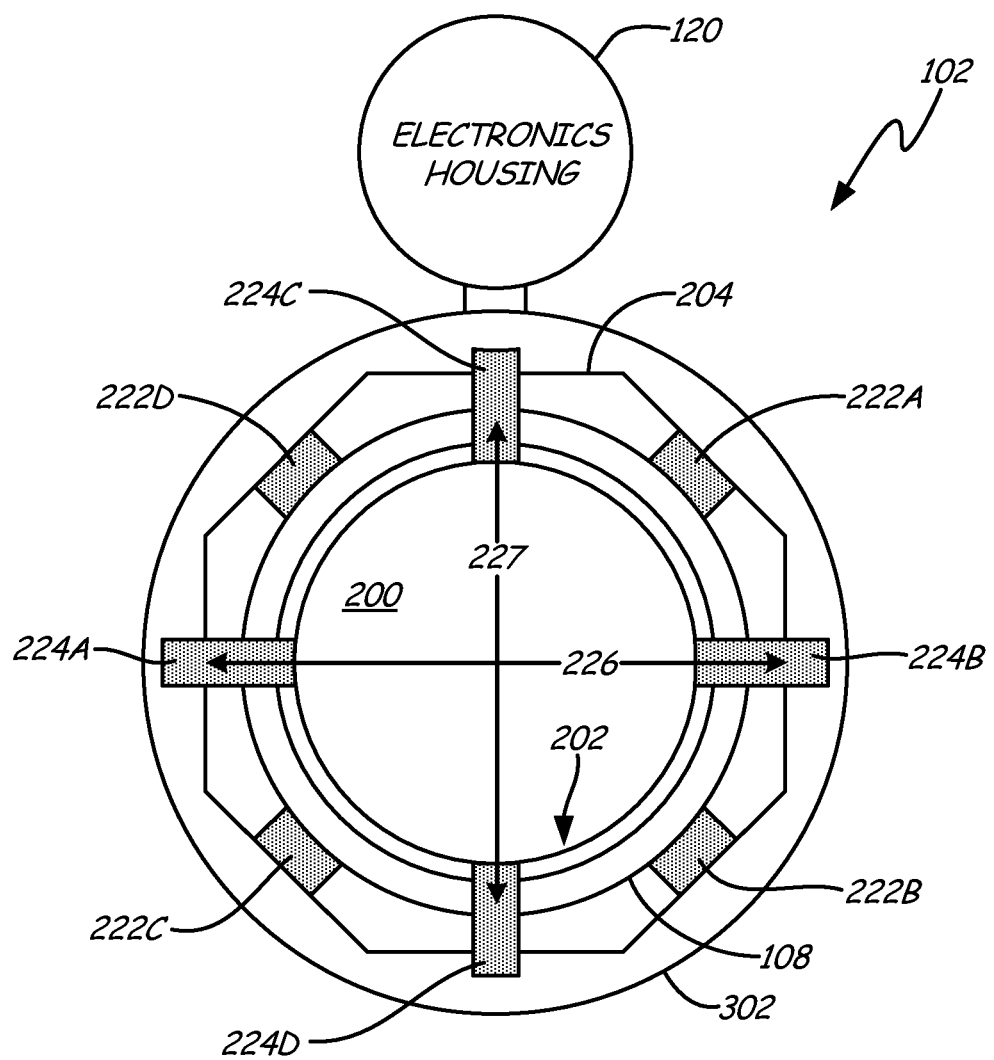
FIG. 3 is a simplified cross-sectional view of the flowmeter which includes a first, second, third and fourth coils.

FIG. 3 is a simplified cross-sectional view of flowmeter 102 and shows flowtube 108 carried in a flowtube housing 302. In one embodiment, the first, second, third and fourth coils 222A, 222B, 222C, 222D, are positioned adjacent the flowtube 108 and evenly spaced around its circumference. The non-conductive flowtube liner 202 lines the flowtube 108 and carries process fluid 200. The flowtube 108 may comprise, for example, stainless steel. A ferromagnetic shield 204 is preferably arranged to conduct the magnetic field around the exterior perimeter of the flowtube 108. This assists in reducing the magnetic reluctance of the magnetic return path, which is primarily outside the flowtube. As shown in FIG. 3, the first and second coils 222A, 222D are located "above" a horizontal electrode axis 226 formed with respect to electrodes 224A, B. Similarly, coils are located "below" the axis 226. By placing coils 222A-D above and below electrodes 2242A, B, the magnetic field can be focused near the electrodes and the total amount (weight) of the coil wire can be reduced without sacrificing sensitivity of the device. Further, when the magnetic field is concentrated near the electrodes, the resultant voltage signal is less likely to be reduced as a result of electrical shorting through an adjacent metallic pipe. In turn, this arrangement permits the use of a flowtube with a shorter length without sacrificing the sensitivity of the flowmeter. Increasing the density of the magnetic field leads to increased signal-to-noise ratio thereby providing more accurate flow measurements.

In FIG. 3 optional third and fourth electrodes 224C, 224D, respectively, are illustrated and form a vertical electrode axis 227. With the addition of the optional electrodes, the voltage differences between any pair of electrodes 224A, 224B, 224C, 224D can be observed and used to increase the accuracy of the flow measurement and detect variations in the flow profile. As shown in an exemplary embodiment in FIG. 3, the first coil 222A is arranged between 0 and 90 degrees, where 0 degrees is perpendicular to the vertical electrode axis 227 and 90 degrees is coincident with the electrode axis 227. The second coil 222B is arranged between 90 and 180 degrees, the third coil 222C is arranged between 180 and 270 degrees, and the fourth coil 222D is arranged between 270 and 360 degrees.

Figure 4:
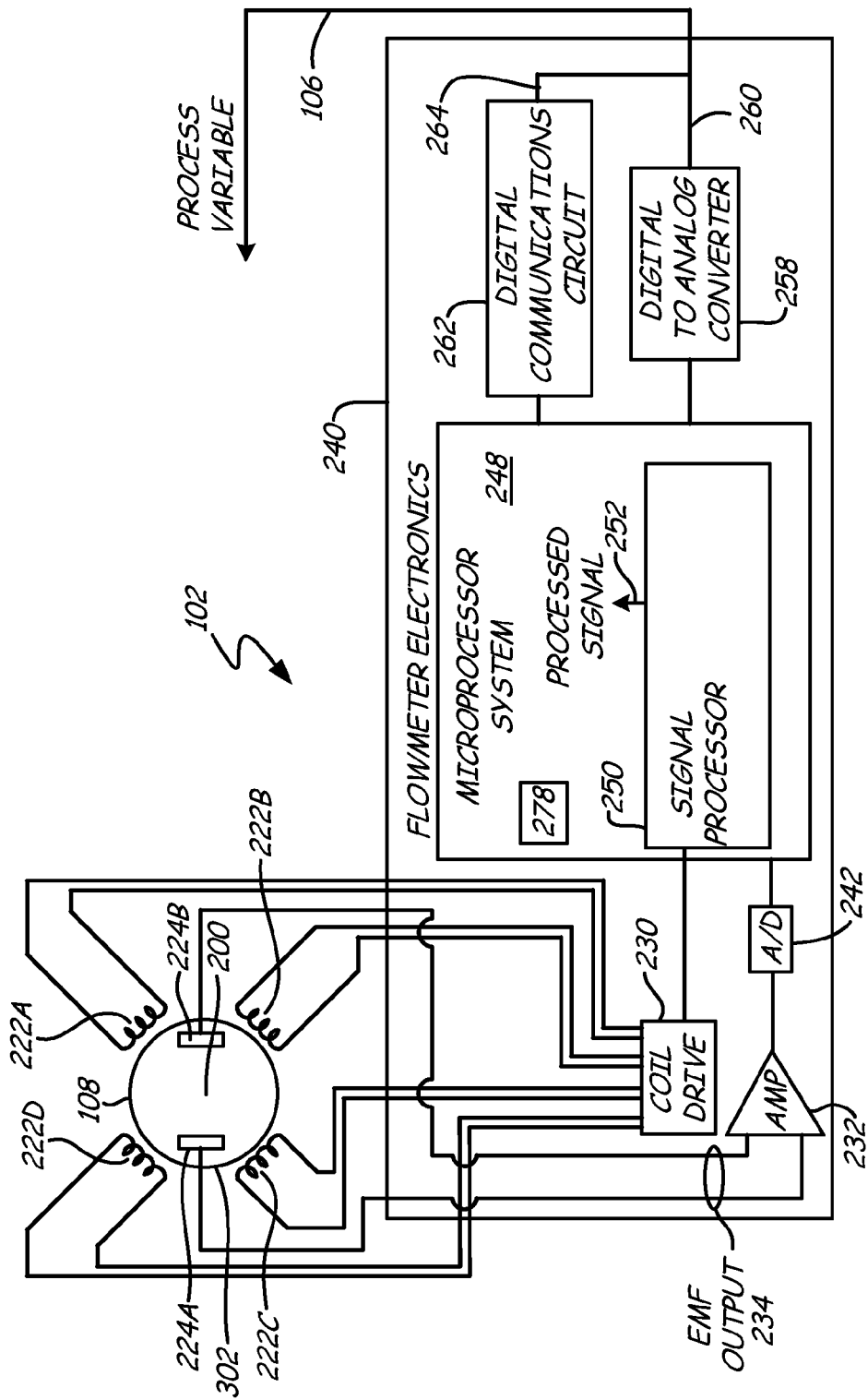
FIG. 4 is a block diagram showing one embodiment of the flowmeter for measuring the flow of the conductive process fluid through the flowtube.

In FIG. 4, a block diagram shows one embodiment of magnetic flowmeter 102 for measuring the flow of the conductive process fluid 200 through flowtube 108. Coils 222A-D are configured to apply a magnetic field to the fluid flow in response to an applied drive current from coil driver 230. The coils 222A-D can be powered either by a sinusoidal alternating current (AC) or a pulsed direct current (DC) (square wave)). Electrodes 224A, 224B electrically couple to the process fluid 200 and provide an EMF signal output 234 to an amplifier 232. The signal 234 is related to the EMF generated in the fluid flow due to the applied magnetic field and fluid velocity. Analog to digital converter 242 provides a digitized representation of the EMF signal to a microprocessor system 248. A signal processor 250 is implemented in microprocessor system 248 which couples to the EMF output 234 to provide an output 252 related to fluid velocity. A memory 278 can be used to store program instructions or other information. Although digital circuitry is shown, the invention can also be implemented using analog circuitry.

Microprocessor system 248 calculates velocity of fluid 200 through flowtube 108 in accordance with a relationship between the EMF output 234 and the flow velocity, as set forth in Faraday's law, which states:

$$V = E/(kBD) \qquad \text{Eq. 1}$$

Where E is the sensed voltage, V is the velocity of the fluid, D is the diameter of the flowtube 108, B is the strength of the magnetic field in the fluid, and k is a constant of proportionality. Microprocessor system 248 uses the sensed voltage to calculate flow of the process fluid in accordance with known techniques. A digital to analog converter 258 coupled to the microprocessor system 248 generates an analog transmitter output 260 for coupling to communication bus 106. A digital communication circuit 262 generates a digital transmitter output 264.

FIGS. 5A-E are cross-sectional views of the flowtube 108 which show the resultant magnetic field patterns in response to energizing various coils. The flowmeter 102 can be configured to energize a single coil, two coils, or more than two coils individually, simultaneously or in different sequential orders. In one embodiment, the sequential order includes energizing each coil individually. For example, at least one of the coils 222A, 222B, 222C, 222D can be energized before another of the coils. In another embodiment, the sequential order includes energizing coils in pairs. In the embodiment shown in FIG. 5, this includes energizing coils 222A, 222B, 222C, 222D in pairs. There are at least six possible permutations of energizing the coils in pairs. In one embodiment, the pair of coils includes opposed coils. In another example embodiment, the pairs of coils which are energized include adjacent coils. Further, the north-south poles of the magnetic field can be reversed by changing the direction of the current flowing through a coil.

As shown in FIG. 5A-H, the magnetic field differs depending upon which coils are energized. When multiple pairs of coils are energized, different magnetic fields are produced from different zones (or regions) within the flowtube 108. The flow of fluid through each magnetic field produces a voltage signal that is related to the average velocity profile across the cross-section of the flowtube at the axial location where the magnetic field is formed. Further, the use of more than two electrodes allows additional information to be collected. More specifically, the voltage which is generated is maximum in a direction that is perpendicular to the flow and perpendicular to the direction of the magnetic field. Thus, a larger voltage response signal can be detected by selecting the appropriate electrode pair based upon the direction of the applied magnetic field. By analyzing the voltage signals generated in response to different applied magnetic fields, it is possible to obtain information related to the flow velocity profile and how the profile varies over a cross section of the flowtube. More specifically, the type of symmetry which is observed is referred to as "axi-symmetrical" which refers to a symmetry through any plane which extends along an axis of the tube. To provide accurate measurements, most flowmeters require the process fluid to exhibit an axi-symmetrical velocity profile. An axi-symmetrical velocity profile is a profile that is swirl-free and symmetrical about the centerline of the flowtube. The velocity profile becomes asymmetrical any time a disturbance in the pipeline (such as an elbow or valve) induces the flow velocity to increase on one side of the pipe and decrease on the other. This leads to the introduction of errors in the flow rate measurement. Depending on the severity of the flow disturbance, the errors can be significant. This will result in a flowmeter that provides less accurate flow measurements.

Figure 5A:
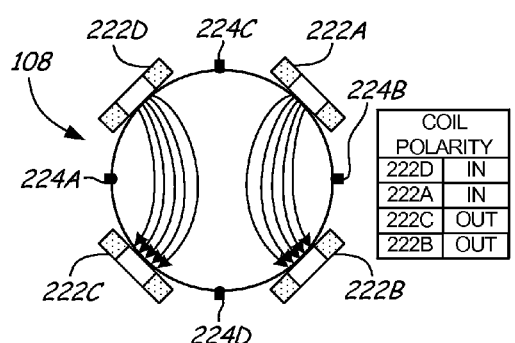
FIGS. 5A-H are diagrams showing the energizing of coils of the flowmeter.

FIG. 5A is a cross-sectional view of flowtube 108 and shows coils 222A-D. Further, in the configuration set forth in 5A, four electrodes 224A-D are shown. In FIG. 5A, coils 222A and 222D are energized in a manner so that their north pole is directed into the flowtube 108 and their south pole is directed away from the flowtube 108. Coils 222B and 222C are energized in an opposite manner wherein the north pole is directed outward and the south pole is directed inward. This is signified in the table which accompanies FIG. 5A. An "in" nomenclature refers to the magnetic north pole being directed inward, whereas "out" indicates the north pole is directed out of the flowtube 108. Further, an "off" nomenclature indicates that the coil is not energized. Based upon this energization, magnetic fields will be generated as indicated by the flux lines shown in FIG. 5A. (Note, the flux lines outside the pipe are not illustrated). This will cause the strongest voltage signal to be generated between electrodes 224A and 224B.

Figure 5C:
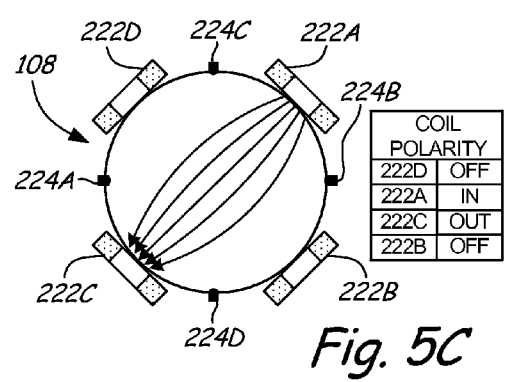
Figure 5B:
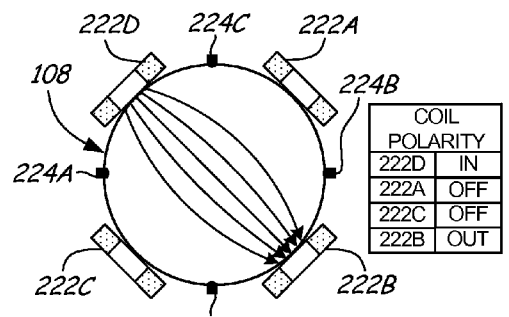

In the configuration of FIG. 5B, a single magnetic field is generated between coils 222D and 222B. In this configuration, the maximum voltage would be observed between either electrodes 224C and 224D and electrodes 224A and 224B. Note that in such a configuration, a difference between these two measured voltages can be used to provide information regarding the flow or used for diagnostics. FIG. 5C illustrates a similar configuration which coils 222A and 222C are energized.

Figure 5D:
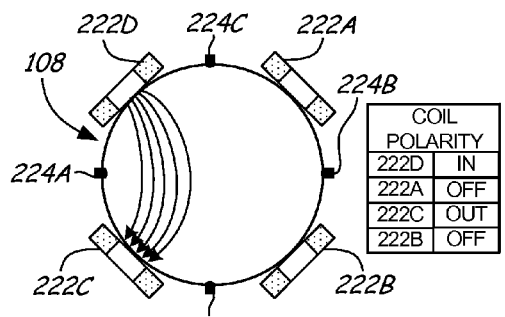
Figure 5E:
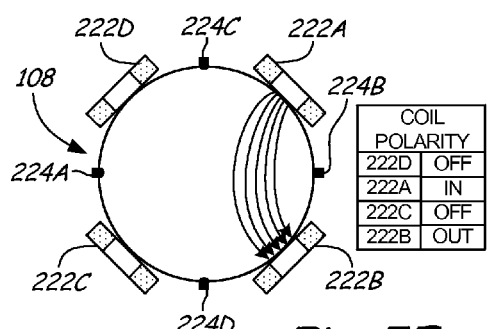

In FIGS. 5D and 5E, a single pair of coils is energized. Specifically, coils 222D and 222C in FIGS. 5D and 222A and 222B in FIG. 5E. In this energizing scheme, the maximum voltage is observed between electrodes 224A and 224B. Differences between two voltage measurements again can be used to provide diagnostic information or additional information regarding the flow profile.

Figure 5F:
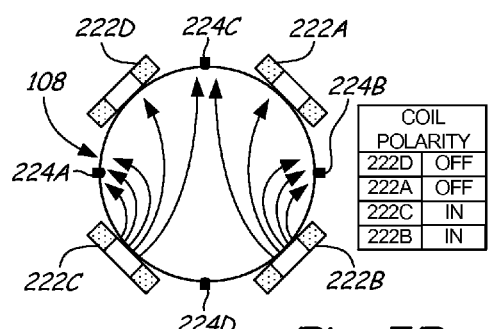
Figure 5G:
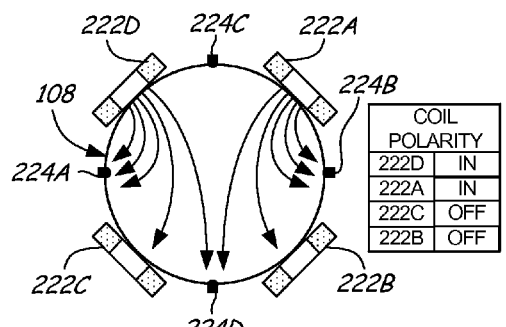
Figure 5H:
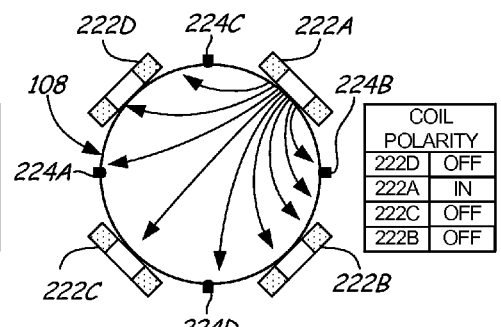

FIGS. 5F and 5G illustrate a configuration in which adjacent pairs of coils are energized with their magnetic fields in the same direction. The other two coils are off. In this configuration, the maximum voltage will be observed between coils 222A and 222B. FIG. 5H illustrates the result in magnetic field when a single coil is energized.

By monitoring the voltages generated based upon the application of the differing magnetic fields, information can be obtained regarding operation of the flowtube, the flow profile, information related to the process fluid itself, and diagnostic information. For example, based upon the applied magnetic field, in some situations the voltages observed between two electrode pairs should be equal. As a specific example, when flow is axisymmetric, the voltage measured between electrodes 224A and 224B should be approximately equal when the coils are energized as in FIG. 5D, as it is when they are energized as in FIG. 5E. However, if the voltage is significantly higher when the coils are energized as in 5E, it can be assumed that the flow is not axisymmetric, and that the average velocity of the fluid is higher on the right side of the flowtube than it is on the left side. In this case the flowmeter may be configured to alert the user that accuracy may be degraded or to correct the error. In some configurations, more than two electrodes are used in calculating the voltage. Further, the various voltages and voltage differences can be stored and used for trending.

In one embodiment, the present invention gathers the signals generated from the different magnetic fields and uses the signals to create data indicative of the flow profile. This can be considered an "image" of the velocity profile. By creating a detailed velocity profile, aspects of the present invention can identify variations in the axi-symmetry present in the profile. The asymmetry in the velocity profile can then be, for example, compensated. This results in a flowmeter that produces more accurate flow measurements. In one embodiment, a plurality of different magnetic fields are generated, the resultant "image" of the velocity profile provides even further details about the velocity profile. By changing which of the coils are energized and/or the polarity of the energized coils, the profile of the applied magnetic field can be altered. This can be used to concentrate the magnetic field on to specific areas ("zones" or "regions") within the flowtube. Additionally, the voltage difference between various electrode pairs 224A, 224B, 224C, 224D can be monitored. This has the effect of increasing the sensitivity of the device in a selected region or "zone" where the field is concentrated and/or where the resultant voltage is observed.

Figure 6:
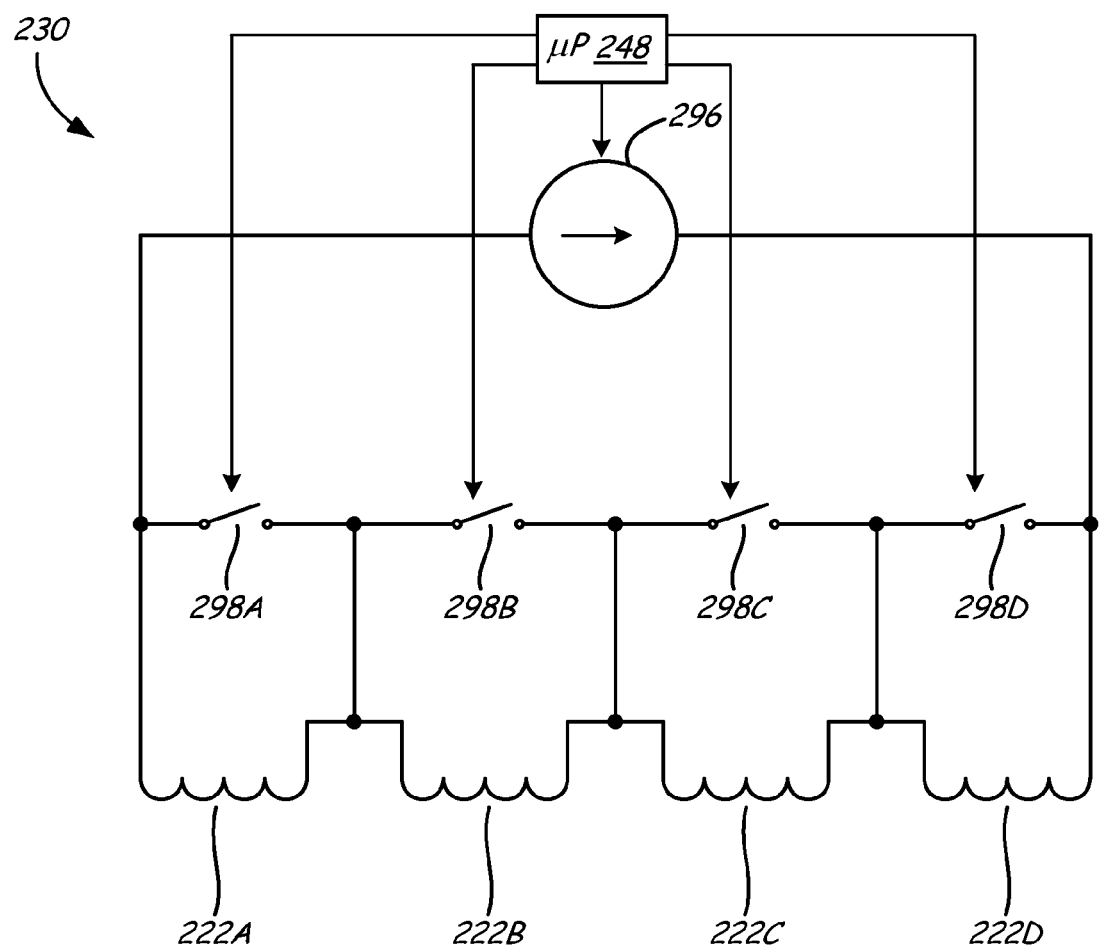
FIG. 6 is a block diagram showing coil driver circuitry of the flowmeter.

FIG. 6 illustrates one embodiment of driver circuitry 230 in electronics housing 120. Coil driver circuitry 230 includes a plurality of switches 298A, 298B, 298C, 298D controlled by the controller 248 and connected the plurality of coils 222A, 222B, 222C, 222D. Controller 248 controls the plurality of switches 298A, 298B, 298C, 298D to selectively couple current source 296 to the plurality of coils 222A, 222B, 222C, 222D. Note that if the direction of the electric current flowing through a coil is changed, the poles of the coil will be reversed. In one configuration, driver circuitry 230 includes additional switches (or other circuitry) which can be used to independently switch a direction of the current through one or more of the plurality of coils 222A, 222B, 222C, 222D.

In one embodiment, each of the coils 222A, 222B, 222C, 222D can be wound onto a spool and then secured to the flowtube 108 using a central stud or the like. A coil can be permanently attached to the flowtube 108. In an exemplary embodiment, the coils 222A, 222B, 222C, 222D can be heated in order to activate the bond coat. Heating the coils will depend upon the material of the spool. Once the coils 222A, 222B, 222C, 222D are wound onto the spool, the coils 222A, 222B, 222C, 222D are then aligned and secured to the flowtube 108. Any appropriate fasteners can be used to secure the coils 222A, 222B, 222C, 222D to the flowtube 108, such as for example studs and nuts. In another example configuration, the coils 222A, 222B, 222C, 222D, and/or electrodes 224A, 224B and optional electrodes 224C, 224D, are secured in a flowtube which is formed of a molded material.

As discussed above, any number of coils can be simultaneously or individually energized as desired. By selecting which of the coils are energized, and/or the polarity of the resulting magnetic field, different magnetic field patterns can be applied to the process fluid. In yet another example configuration, the strength of the applied magnetic field is adjusted by changing the amount of current applied to one or more of the coils. In addition to altering the applied magnetic field, the present invention also includes the use of more than two electrodes to sense a resultant voltage. For example, referring back to FIG. 3, if four electrodes are used and a magnetic field is applied to the process fluid, a resultant voltage can be sensed between electrodes 224A and 224C along with a resultant voltage between electrodes 224B and 224D. A difference between these two sensed voltages can indicate a variation in the flow profile of the process fluid. Once a variation in the process fluid flow profile is detected, the microprocessor 248 can be used to compensate for this variation. For example, the memory 278 can store compensation information in the form of fixed values or a compensation equation. Such an equation may take the form of, for example, a polynomial equation. For example, if an electrode pair detects a voltage when the magnetic field is applied in a direction which is parallel to a line between the two electrodes, the calculated flow value may be increased or decreased based upon a characterization process of the flowtube. The characterization of the flowtube can be performed during manufacturing of the flowmeter and the characterization information stored in the memory 278.

Thus, with the present invention, information related to the flow of the process fluid can be collected through the application of multiple different magnetic fields by selectively energizing the appropriate magnetic coil. Similarly, if more than two electrodes are employed, variations in a resultant voltage between different locations on the flowtube can also be observed. This additional information can be used to compensate flow measurements and perform diagnostics on the flowtube, process fluid or other components. The additional information can also be used to gather information related to the process fluid itself. For example, the particulate concentration in the process fluid, may be detected by observing variations in measurements due to application of differing magnetic fields or sensing of different voltages. This information can also be used to identify clogging, deposits or corrosion of the flowtube and associated piping. The information can be monitored over time to observe trends.

Although the present invention has been described with reference to preferred embodiments, workers skilled in the art will recognize that changes may be made in form and detail without departing from the spirit and scope of the invention. Although embodiments of the present invention have been described as including four coils and two or four electrodes, the number of coils and electrodes that can be used with the present invention is not limited this configuration. As illustrated in FIGS. 5A-5H, an arrangement is provided in which the electrodes are radially offset from the coils such that a line between any pair of electrodes forms an acute angle with a line between any pair of coils. As the number of coils and/or the number of electrodes is increased, the velocity profile asymmetry can be more accurately measured and a finer resolution of the image of the velocity profile asymmetry can be obtained. Diagnostics can also be performed based upon the process fluid. This can include performing diagnostics based upon sludge in the process fluid which may appear as an increase in the asymmetry of the velocity profile. Similarly, corrosion or fouling of the flowtube may also appear as a change in the velocity profile. Further, the configuration of the coils and electrodes increases the efficiency of the flowmeter and reduces the amount of current required to obtain a measurement.

What is claimed is:

1. A magnetic flowmeter for measuring a flow of a process fluid, comprising:
a flow tube arranged to receive the flow of process fluid therethrough;
a first coil arranged adjacent the flow tube;
a second coil arranged adjacent the flow tube;
a third coil arranged adjacent the flow tube;
drive circuitry configured to apply a magnetic field to the process fluid using the first, second and third coils;
first and second electrodes arranged to sense an electrical potential of the process fluid related to the applied magnetic field and flow rate of the process fluid; and
a controller configured to calculate the flow of the process fluid based upon the electrical potential sensed by the first and the second electrodes;
wherein the first and second electrodes are radially offset from the coils such that a line between the first and second electrodes forms an acute angle with a line between any of the first, second and third coils.

2. The flowmeter of claim 1, further comprising a fourth coil arranged adjacent the flow tube.

3. The flowmeter of claim 2, wherein the first and fourth coils are located above a horizontal axis between the first and second electrodes and the third and second coils are located below the horizontal axis.

4. The flowmeter of claim 2, wherein the coils are energized in pairs.

5. The flowmeter of claim 4, wherein the pairs comprise opposed coils.

6. The flowmeter of claim 1, wherein the driver circuitry comprises a switch configured to selectively couple a current source to a coil.

7. The flowmeter of claim 1, wherein the first and second coils are located on one side of an axis of the first and second electrodes and the third coil is located on another side of the axis.

8. The flowmeter of claim 1, further comprising a shield arranged to conduct a magnetic field around an exterior perimeter of the flow tube.

9. The flowmeter of claim 1, wherein the controller is configured to identify asymmetries in a velocity profile of the process fluid.

10. The flowmeter of claim 9 wherein the controller is adapted to correct the errors detected in the flow measurement.

11. The flowmeter of claim 1, wherein the controller is adapted to detect errors in flow measurements based upon a velocity profile.

12. The flowmeter of claim 1, wherein the flowmeter is configured to perform diagnostics based upon a velocity profile of the process fluid.

13. The flowmeter of claim 1, wherein the first, second and third coils are energized at the same time.

14. The flowmeter of claim 1, wherein the coils are energized individually.

15. The flowmeter of claim 1 including a third electrode arranged to sense an electrical potential of the process fluid related to the applied magnetic field and flow rate of the process fluid.

16. A method of measuring a flow of a process fluid, comprising:
arranging a flow tube to receive the flow of the process fluid;
arranging a first coil adjacent the flow tube;
arranging a second coil adjacent the flow tube;
arranging a third coil adjacent the flow tube;
applying a magnetic field to the process fluid using the first, second and third coils;

arranging first and second electrodes positioned at an angle with respect to the first, second and third coils to sense an electrical potential of the process fluid related to the applied magnetic field between any pair of the first, second and third coils and a flow rate of the process fluid; and calculating the flow of the process fluid using a controller based upon the electrical potential sensed by the first and the second electrodes.

17. The method of claim 16, including arranging a fourth coil adjacent the flow tube.

18. The method of claim 17, including energizing coils in pairs.

19. The method of claim 18, wherein energizing the coils in pairs comprises energizing opposed coils.

20. The method of claim 16, wherein the coils are energized individually.

21. The method of claim 16, further comprising identifying asymmetries in a velocity profile of the process fluid.

22. The method of claim 16, further comprising correcting errors in flow measurements due to asymmetries in a velocity profile of the process fluid.

23. The method of claim 16, further comprising performing diagnostics based upon asymmetries in a velocity profile of the process fluid.

24. The method of claim 16, further comprising arranging a third electrode to sense an electrical potential of the process fluid related to the applied magnetic field and flow rate of the process fluid.

* * * * *